(12) United States Patent
Stepanova

(10) Patent No.: US 6,568,314 B1
(45) Date of Patent: May 27, 2003

(54) COOKING DEVICE WITH REVERSIBLE MULTI-FUNCTIONAL TOP

(76) Inventor: Irina Terekhina Stepanova, 28081 Marguerite Pkwy., Mission Viejo, CA (US) 92691

( * ) Notice: Subject to any disclaimer, the term of this patent is extended or adjusted under 35 U.S.C. 154(b) by 0 days.

(21) Appl. No.: 09/945,948

(22) Filed: Sep. 4, 2001

(51) Int. Cl.[7] .......................... A47J 27/00; A47J 27/06; B01D 35/02; B01D 35/28
(52) U.S. Cl. ............................ 99/340; 99/413; 99/403; 210/464; 210/465
(58) Field of Search .......................... 99/339, 340, 352, 99/353, 403, 404, 405, 406, 407, 408, 409, 410, 411, 412, 413, 414, 415, 447, 448, 449, 450, 482; 220/912, 573.1, 573.4, 485, 493, 494, 630; 210/464, 465, 474; D7/667, 361

(56) References Cited

U.S. PATENT DOCUMENTS

| | | | | |
|---|---|---|---|---|
| 1,589,486 A | * | 6/1926 | Sharpneck | 210/464 |
| 1,623,397 A | * | 4/1927 | Dunlap | 210/465 |
| D347,964 S | * | 6/1994 | Davis | D7/361 |
| 5,771,792 A | * | 6/1998 | Chen | 210/464 X |
| 5,957,038 A | | 9/1999 | Shimazaki | |

* cited by examiner

Primary Examiner—Reginald L. Alexander

(57) ABSTRACT

An improved cooking device is intended for multi-functional cooking processes, providing function not only as a conventional cooking pot, but also as a strainer, colander and steamer. The improved cooking device comprises a pot with at least one handle, a lid with at least one handle, and a multi-functional reversible top, including a hoop with at least one handle rigidly connected to the hoop, a rim, and a hemispherical body rigidly connected by its cross-section to the hoop. The hemispherical body has at least one aperture to drain the liquid, and the pot's rim has an outside diameter that is less than the inside diameter of the top's rim.

6 Claims, 2 Drawing Sheets

COOKING DEVICE WITH REVERSIBLE MULTI-FUNCTIONAL TOP

FIELD OF THE INVENTION

The present invention relates to the field of cooking systems, and particularly, to a cooking devices with a reversible multi-function top.

BACKGROUND OF THE INVENTION

Many kinds of cooking pots are used to boil food. For example, the deep pots, are commonly used to cook pasta, vegetables, and long noodles such as spaghetti. Usually, when food is boiled, a strainer or colander is required to drain liquid/water. In the absence of a strainer or colander, resort is sometimes made to using a additional dish or some other means, to hold food inside the pot while draining liquid, but that food can easily be dropped from the pot, and steam burns are a common occurrence.

Also, for instance, pasta cooking inserts have become popular. Pasta cooking inserts with perforations are two pots with one into another used to cook food, as well as drain it. The food is placed into the insert which is then placed into the pot, and, after the water is boiled and the food cooked, the insert is removed, allowing water to drain through the perforations. While pasta cooking inserts are used to drain water, they tend to be expensive and bulky. Mostly, they usually cannot be used as a strainer, i.e., to simply drain water from the pot and leave the food inside.

A vegetable steamer insert, for example, which fits inside a larger pot, has perforations to allow steam to enter from the pot. A lid is provided that covers the pot and insert to trap the steam inside. Sometimes, because they have perforations, steamer inserts are used as colanders. For example, a user may transfer food from the pot to the insert to drain the water. When the insert is used in this manner the same problems can exist, i.e., food can easily be dropped from the pot, and steam burns are the occurrences. Mostly, some kinds of food like pasta cooking inserts or steamer inserts cannot be used as strainers.

In order to obtain all of the advantages and functions described above, users have to own the separate strainers, colanders and steamers, along with a cooking pot, which is inconvenient and costly. The known cooking system by U.S. Pat. No. 5,957,038 provides comprises three pieces: a pot, a top and a lid). The pot functions by itself as a conventional cooking pot. The top functions by itself right-side-up as a colander. The pot and top with a lid functions as a steamer. And, the top, when positioned up-side-down on top of the pot, functions as a strainer. When used as a strainer, the top and pot have engaging handles that allow the top and pot to be held together with one hand, to help avoid dropping food and steam burns.

More subjectively, the mentioned prior art includes a pot with a special configuration handle (a position of the handle has to be specifically oriented) and a multi-function reversible top with the handle, which can be positioned either right-side-up or up-side-down on the pot. For use as a strainer, both the pot and top have engaging handles that are configured and oriented such that they can be brought together and mated with one another. The pot's handle and the top's handle are presented by either "male-female" or "female-male" combination.

The pot has a rim into which the top is fitted, either right-side-up or up-side-down.

The top piece has a dish or bowl shaped body and a handle extending from its side. The top's rim has an outside diameter that is less than the inside diameter of the pot's rim to allow the top's rim to be inserted inside the pot's rim when the top is positioned up-side-down on top of the pot, i.e., for use as a strainer.

The handles on the top and pot are configured and oriented so that they engage and/or otherwise mate with one another when the top is positioned up-side-down on top of the pot, i.e., used as a strainer. This enables the two handles to be grasped as a single combination handle during straining to make the present invention easy to use.

In order to be a single combination, one of the handles has one or more male portions, and the other handle has one or more associated female portions, to enable the handles to be brought together, engaged and held securely with one hand.

According to the mentioned patent, the described cooking system requires the special configuration of the top and pot handles (male-female) to form a single combination handle, that does not provide the universality of the top, which could be used with the other pots, having the different configuration of the handle. Also the top, having the diameter of the top specially adjusted to be inserted into a priori specified pot providing a smallest gap between the pot's side wall and the inserted top's rim, does not provide the possibility to use the same top with the other pots, having the larger pot's rim diameter or having the different pot's side wallconfigurations (for example, not straight pot's side wall).

Thus, there is a great need, therefore, for a cooking device that provides the functions and advantages of conventional pots, strainers, colanders and steamers, in one, providing the compatibility of the top in use with the other conventional pots. Such universality decreases the cost of the cooking sets and the total quantity of the needed cooking device pieces.

OBJECT AND ADVANTAGES OF THE INVENTION

Accordingly, several objects and advantages of the present invention are to provide tile functions and advantages of conventional pots, strainers, colanders and steamers.

It is another object of the invention to provide the compatibility of the top in use with the other conventional pots.

It is still another object of the invention to decreases the cost of tile cooking sets.

Still, further objects and advantages will become apparent from a consideration of the ensuing description accompanying drawings.

DESCRIPTION OF THE DRAWING

In order that the invention and the manner in which it is to be performed may be more clearly understood, embodiments thereof will be described by way of example with reference to the attached drawings, of which.

SUMMARY OF THE INVENTION

The improved cooking device is intended for multi-functional cooking processes, providing function not only as a conventional cooking pot, but also as a strainer, colander and steamer. The improved cooking device comprises a pot with at least one handle, a lid with at least one handle and a multi-functional reversible top, including a hoop with at least one handle rigidly connected to the hoop, a rim, and a hemispherical body rigidly connected by its cross-section to the hoop. The spherical body has at least one aperture to drain the liquid. The pot's rim has an outside diameter that is less than the inside diameter of the top's rim.

DESCRIPTION OF THE PREFERRED EMBODIMENTS

Here the description of an improved cooking device will be done in statics (as if the components of the improved device are suspended in the space) with description of their relative connections to each other. The description of the functional operations of an improved cooking device will be done hereinafter.

Figure 1:
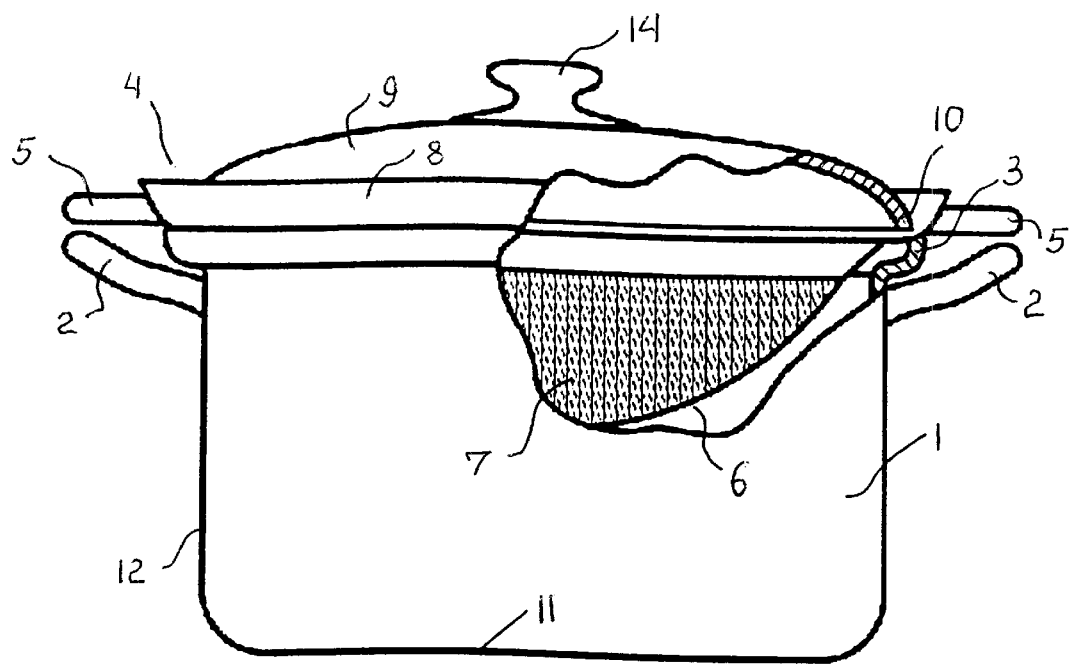
FIG. 1 is a simplified drawing of the cooking device assembly.
Figure 2:
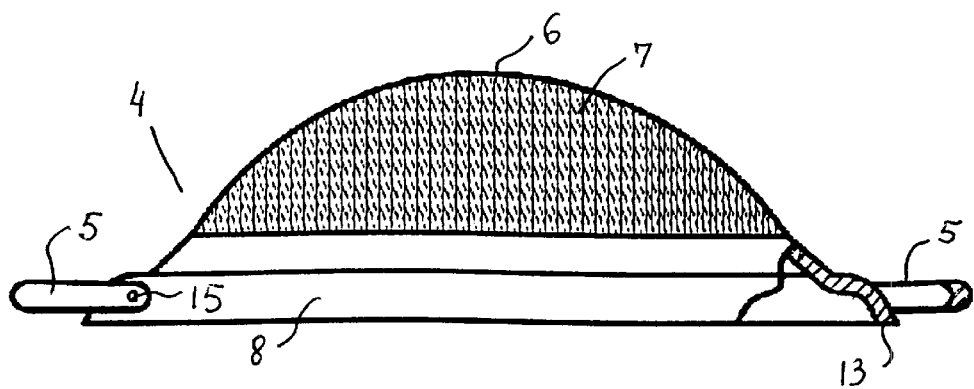
FIG. 2 is a simplified drawing of the top.

Referring to FIG. 1, an improved cooking device comprises a pot 1, having at least one handle 2, a lid 9 with at least one handle 14, and a top 4, including at least handle 5, a hoop 8, a hemispherical body 6, having at least one aperture to drain a liquid (the hemispherical body 6 can have perforations or can be presented by screen as conventionally shown on FIGS. 1–4). The handle 2 (or handles 2) of the pot 1 is rigidly connected to the pot 1 (for example, by the rivet(s) 16) and the handle 5 (or appropriate quantity of handles 5) is rigidly connected to the hoop 8 of the top 4 (for instance, by the rivet(s) 15). The improved cooking device is intended for multi-functional cooking processes, providing function not only as a conventional cooking pot, but also as a strainer, colander and steamer. The top 4 is a multi-function reversible top, which can be positioned either right-side-up or up-side-down on the pot 1. For standard cooking operations, the pot 1 is used with a lid 9. If the top 4, having at least one handle 5, is used right-side-up by itself, it performs a colander functions. If the pot 1 and top 4 are combined with a lid 9, they function as a steamer. When the top 4 is turned up-side-down on the rim 3 of the pot 1, the top 4 functions as a strainer, for instance, to drain liquid from the food into the pot 1. For use as a strainer, both the pot 1 and top 4 have the appropriate quantity of the handles 2 and 5 respectively, that are oriented such that they can be grasped with the hand or hands. The pot 1 is configured as the most conventional pot used for cooking having a bottom wall 11, a side wall 12 that is cylindrical, and the handles 2 (at least one handle 2). The pot has a rim 3, the outside diameter of which can be fitted into the top's rim 4. It also has a lid 9, having the rim 10 that can fit on both the pot 1 and top 4, as will be described hereinafter.

The top 4 has a hoop 8, rigidly connected to a hemispherical (bowl shaped) body 6 and at least one handle rigidly connected to the hoop 8. The hoop 8 is so configured, that it can rest on the rim 3 of the pot 1 as shown on FIGS. 1, 3, 4. By other words, the hoop 8 has some kind of the ledge with the rim 13. The hemispherical body 6 of the top 4 can have the perforations or can be made of the screen (link) material, as shown, for example, on FIGS. 1–4. The rim 13 of the top 4 has an inside diameter that is greater than the outside diameter of the rim 3 of the pot 1. The hemispherical body 6 has a maximal cross-sectional diameter less than the inside diameter of the rim 3 of the pot 1, allowing the hemispherical body 6 to be inserted inside the pot 1 when the top 4 is positioned right-side-up on the pot 1 for use as a steamer. The rim 13 of the top 4 is configured in the manner, allowing the top 4 to rest up-side-down or right-side-up on the rim 3 of the pot 1. The cells 7 of the hemispherical body 6 (or apertures/perforations on the hemispherical body 6) provides the steam or liquid passage (drain) through the top 4. The handles 5 of the top 4 and handles 2 of the pot 1 are configured and oriented so that they engage and/or otherwise mate with one another when the top is positioned up-side-down or right-side-up on the pot 1. The lid 9 of the pot 1 can be like any conventional lid for covering a cooking pot. The lid 9 can be used to cover both the pot 1 and top 4.

The inside diameter of the rim 13 of the top 4 (the diameter of the hoop's edge) is big enough so that the top 4 overlaps the rim 3 of the pot 1 to some degree. The cells 7 of the hemispherical, body 6 (the apertures/perforations on the hemispherical body 6) can have any regular and/or irregular geo-metrical forms (e.g., square, triangle, star forms, etc.) and size in order to keep small food items inside the top 4 during liquid/water drain. The ledge of the hoop 8 of the top 4 has preferably a bended form, as shown on FIGS. 1–4, that provides the remaining the pot 1 inside of the top 4 when the top 4 is used as a strainer and the remaining the lid 9 on the top 4 when the top 4 is used as a steamer. The most conventional cooking pots have two handles (see FIGS. 1, 3), but as shown on FIG. 4, the handles 17 and 18 allows the user to hold the pot 1 and top 4 combination with one hand.

The handles can be made of a material, such as one that is lower in heat conduction, for instance, such as plastics, rubber-base materials, carbon graphite, wood, foam, etc., and the likes.

Figure 3:
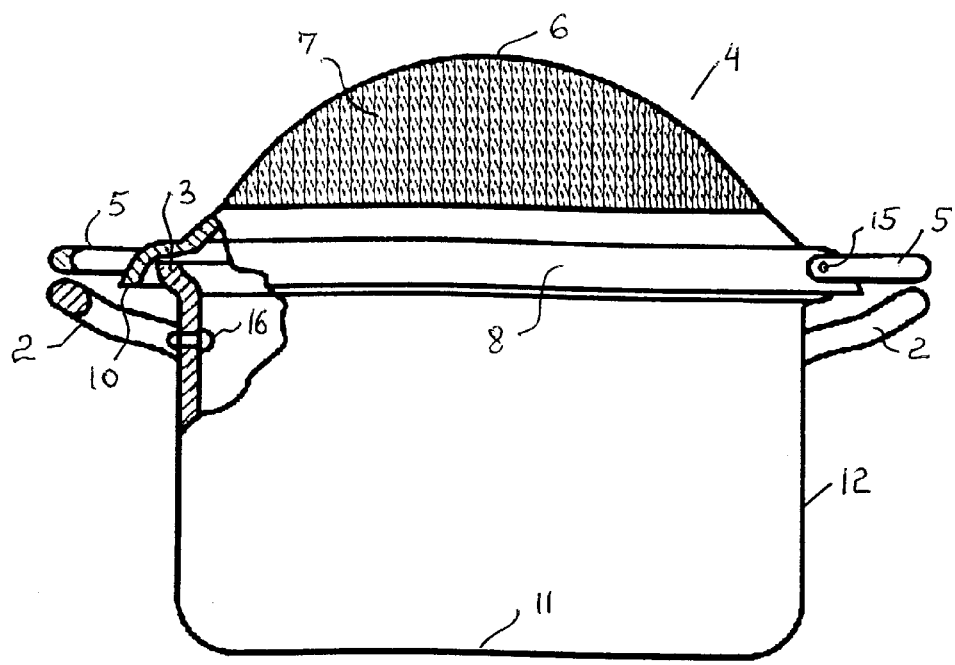
FIG. 3 is a simplified drawing of the first configuration of the handles.
Figure 4:
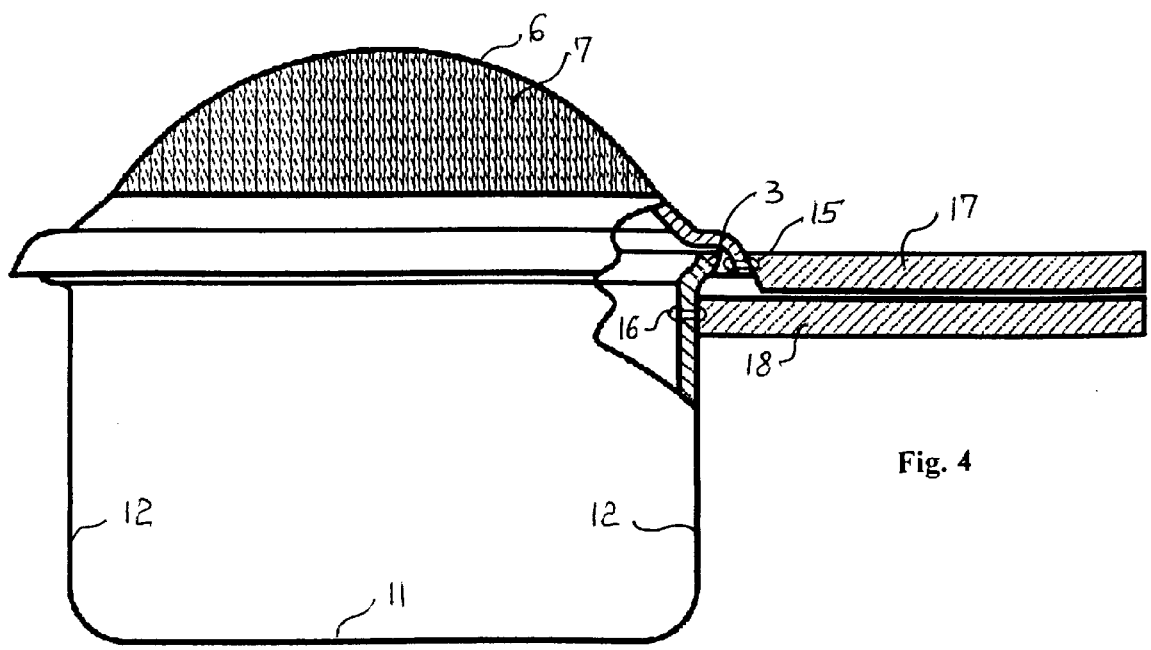
FIG. 4 is a simplified drawing of the second configuration of the handles.

Having the improved cooking set, including the pot 1 and top 4, the user, using two pair of handles, as shown on FIGS. 1, 3, is not needed someone else helping to hold the top 4, that can cause hot steam injury.

The top 4 can be used in several ways, e.g. as a strainer to drain liquid/water from the food after it is cooked in the pot 1. It can be reversed up-side-down, positioning on the pot 1 after the food is cooked inside the pot 1, and, by turning the pot 1 sideways, or up-side-down, together with top 4, using the handles 2 and 5, liquid can be drained from the pot 1 through the cells 7 while keeping the food inside the top 4.

It is understandable, that the verity of the handle design can be used and a various handle configurations are possible.

The improved cooking device operates as follow.

For the purpose of a strainer, the top 4 is placed on the pot 1 (on the top of the pot 1), up-side-down. The rim 13 of the hoop's ledge overlaps the rim 3 of the pot 1 in such manner that the top 4 is resting on the pot 1.

The position of the top 4 on the pot 1 is aligned by horizontal rotation of the top 4 so that the handles 5 are positioned substantially over the positions of the handles 2 of the pot 1 respectively.

It means, that with the top 4 on the pot 1, the position of each handle 5 of the top 4 are aligned so that it is positioned substantially over the appropriate pot's handle. Such handles 5 and 2 orientation provides the user with possibility to grasped and held the pot 1 and top 4 combination together when turning the pot to drain water from the pot, providing the liquid passage through the cells 7, remaining the food inside the pot 1.

For the purpose of a steamer, water is placed in the pot 1, the food is placed in the top 4, placed on the pot 1 right-side-up, and the lid 9 is placed on the top 4. The water level and the peak of the spherical body 6 do not touch each other. The water is boiled, the steam passes through the cells 7 into the top 4, thereby cooking/steaming the food placed inside the top 4.

For the purpose of a colander, the top 4 is used by itself in the right-side-up position, so the food can be transferred from the pot 1 into the top 4 in order to drain a liquid through the cells 7 of the spherical body 6 of the top 4.

Also, the pot 1 and lid 9 can be used as a regular cooking set.

CONCLUSION, RAMIFICATION AND SCOPE

Accordingly the reader will see that, according to the invention, I have provided the cooking device intended for multi-functional cooking processes. The improved cooking devise provides function not only as a conventional cooking pot, but also as a strainer, colander and steamer.

While the above description contains many specificities, these should not construed as limitation on the scope of the invention, but as exemplification of the presently-preferred embodiments thereof. Many other ramifications are possible within the teaching to the invention. For example, an improved cooking device eliminates the possibility of the skin injury by the hot liquid/water leaking along the handle from the gap between pot's side wall and top's rim inserted into the pot, possibility to use the top of the improved cooking device with the other cooking set pots, having insignificant different rim's diameter and/or form.

Thus, the scope of the invention should be determined by the appended claims and their legal equivalents, and not by examples given.

THE DRAWING REFERENCE NUMERALS WORKSHEET 1. a pot;
2. a handle of the pot;
3. a rim of the pot,
4. a top;
5. a handle of the top;
6. a spherical body;
7. a cell of the screen;
8. a hoop;
9. a lid;
10. a rim of the lid;
11. a bottom wall of the pot;
12. a side wall of the pot;
13. a rim of the top,
14. a handle of the lid;
15. a rivet;
16. a rivet,
17. a handle;
18. a handle.

What is claimed is:

1. A cooking device with reversible multi-functional top includes:
    a pot comprising at least one handle extending therefrom and rigidly connected to said pot, and a rim
    a reversible top including
        at least one handle extending therefrom and rigidly connected to a hoop;
        a top's rim, having an inside diameter greater than an outside diameter of said rim of said pot providing the position of said rim of said pot inside of said top's rim when said top is placed up-side-down on said pot for the purpose of the strainer, and
        a hemispherical body rigidly connected by its cross-section to said hoop of said top, and wherein said hemispherical body has at least one aperture for liquid passage, and the diameter of said cross-section is less than the inside diameter of the pot's rim, providing the position of said body of said top inside of the pot's rim when said top is placed right-side-up into said pot for the purpose of the strainer; and
    a lid including at least one handle and a lid's rim, the outside diameter of which is less than said inside diameter of said top's rim.

2. The device of claim 1, wherein said at least one aperture of said hemispherical body is further presented by perforations.

3. The device of claim 1, wherein said hemispherical body is further presented by a screen material with cells.

4. The device of claim 1, wherein said lid's rim further has the outside diameter that is less than said inside diameter of said top's rim and less than the inside diameter of the pot's rim.

5. The device of claim 1, wherein said lid's rim further has the outside diameter that is less than said inside diameter of said top's rim and greater than the inside diameter of the pot's rim.

6. The device of claim 1, wherein said lid's rim further has the outside diameter that is greater than said inside diameter of said top's rim and greater than the inside diameter of the pot's rim.

* * * * *